(12) United States Patent
Rycyna et al.

(10) Patent No.: US 10,949,157 B2
(45) Date of Patent: Mar. 16, 2021

(54) MODULAR DISPLAY SYSTEM WITH ETHERNET CONNECTION AND CONTROL

(71) Applicant: Cirrus Systems, Inc., Saco, ME (US)

(72) Inventors: Stephen David Rycyna, Stratham, NH (US); Christian Knight, Saco, ME (US); Roshan Barua, Portland, ME (US)

(73) Assignee: Cirrus Systems, Inc., Portsmouth, NH (US)

( * ) Notice: Subject to any disclaimer, the term of this patent is extended or adjusted under 35 U.S.C. 154(b) by 0 days.

(21) Appl. No.: 16/416,841

(22) Filed: May 20, 2019

(65) Prior Publication Data

US 2019/0377535 A1 Dec. 12, 2019

Related U.S. Application Data

(60) Provisional application No. 62/681,821, filed on Jun. 7, 2018.

(51) Int. Cl.
*G06F 3/14* (2006.01)
*H04L 12/28* (2006.01)
*G09G 5/00* (2006.01)
*H04N 7/08* (2006.01)
*H04N 7/10* (2006.01)

(52) U.S. Cl.
CPC ........... *G06F 3/1446* (2013.01); *G09G 5/006* (2013.01); *H04L 12/28* (2013.01); *H04N 7/08* (2013.01); *H04N 7/10* (2013.01); *G09G 2300/026* (2013.01); *G09G 2360/04* (2013.01); *G09G 2360/18* (2013.01)

(58) Field of Classification Search
CPC .................. G06F 3/1446; G09G 5/006; G09G 2300/026; G09G 2360/04; G09G 2360/18; H04L 12/28; H04N 7/08; H04N 7/10

See application file for complete search history.

(56) References Cited

U.S. PATENT DOCUMENTS

| | | | |
|---|---|---|---|
| 2003/0069891 A1* | 4/2003 | McClintock | G09G 5/12 |
| 2013/0222386 A1* | 8/2013 | Tannhauser | G06T 11/60 345/428 |
| 2014/0002330 A1* | 1/2014 | Teramae | G06F 3/1446 345/30 |

(Continued)

*Primary Examiner* — Michael E Teitelbaum
(74) *Attorney, Agent, or Firm* — Clocktower Law LLC; Erik J. Heels; Michael A. Bartley (57) ABSTRACT

The present invention provides a modular display system that uses Ethernet connection to directly send control and display data to each display module. The modular display system includes a master control unit and a plurality of display modules that are arranged and connected together to create a larger unified display. The control unit is connected to the display modules to send display and control data, and to receive diagnostic data, all via Ethernet connection. In some embodiments, each display module has an input Ethernet connection for upstream communication and an output Ethernet connection for downstream communication. The modules in this configuration are connected together in a daisy-chain fashion and Ethernet connection between the control unit and display modules creates a local area network (LAN) where all modules are addressable by the control unit and relevant data can be transferred.

13 Claims, 9 Drawing Sheets

(56) References Cited

U.S. PATENT DOCUMENTS

| | | | | |
|---|---|---|---|---|
| 2015/0228246 A1* | 8/2015 | Kim | ............... | G06F 3/14 |
| | | | | 345/520 |
| 2015/0304532 A1* | 10/2015 | Bart | ............... | H04N 5/2252 |
| | | | | 348/373 |
| 2016/0034244 A1* | 2/2016 | Howard | ............... | G06F 3/1446 |
| | | | | 345/156 |
| 2017/0024179 A1* | 1/2017 | Terao | ............... | G06F 3/1446 |

* cited by examiner

MODULAR DISPLAY SYSTEM WITH ETHERNET CONNECTION AND CONTROL

BACKGROUND OF THE INVENTION

1. Field of the Invention

The present invention relates to electronic signage and display systems. In particular, the present invention relates to component connection and control arrangements for modular display systems.

2. Description of the Prior Art

Billboards and other types of large signs are used extensively to advertise and present products and ideas to the public. Recently, light-emitting diodes (LEDs) have been used in billboard systems to display programmed messages, images, and videos. Particularly, LED-based modular display systems have been developed that can be conveniently customized to form an electronic billboard with a specified size.

Currently, sending video and control data throughout a modular display system involves the use of video sending units, which interface with the video output signal of a multimedia source (e.g. A PC with HDMI, DVI, VGA, etc.) and convert the video signal into a data stream which is sent to the display modules using a suitable interface and protocol. These systems may also need to use control cards that are external to the display modules and require additional connections. The additional hardware components required for this method add complexity and cost to the overall system and make it more difficult to manufacture and install in the end application.

Therefore, there is a need for modular display systems that are more cost-efficient and convenient for the end users than is currently available.

SUMMARY OF THE INVENTION

The objective of the present invention is to provide a modular display control system that does not require separate video sending units and control cards. Instead, the modular display system uses Ethernet connections to directly send control and display data to each display module.

In an embodiment of the invention, there is provided a modular display system formed by a combination of a master control unit and a plurality of display modules that are arranged and connected together to create a larger unified display. The master control unit can be a computing device such as a personal computer, a tablet, a multimedia player or any other type of computing device that has an Ethernet interface. The master control unit is connected to each of the plurality of display modules in a parallel configuration to send display and control data, and to receive diagnostic data, all via Ethernet connection. The display modules are any type of display modules suitable to display selectable content in a visual output. Examples of the types of display modules suitable for the modular display system of the present invention include those disclosed in U.S. Pat. No. 8,992,037 and in published US patent application Publication No. 2016/0224306. The entire contents of those two documents are incorporated herein by reference.

In another embodiment of the present invention, there is also provided a modular display system formed by a combination of a master control unit and a plurality of display modules that are arranged and connected together to create a larger unified display. The master control unit can be a computing device such as a personal computer, a tablet, a multimedia player or any other type of computing device that has an Ethernet interface. The master control unit is connected to the plurality of display modules in a serial configuration to send display and control data, and to receive diagnostic data, all via Ethernet connection. In this embodiment, each display module of the plurality of display modules has an input Ethernet connection for upstream communication and an output Ethernet connection for downstream communication. The modules of this embodiment of the invention are connected together in a daisy-chain fashion. The master control unit is connected to an input of a first module of the plurality of display modules. An output of that first module is connected to an input of a second module of the plurality of modules the first module. This coupling of the output of one module to the input of another module continues for the remainder of the set of display modules used to form a display.

In another aspect of the present invention, in some embodiments, the Ethernet connection between the master control unit and the plurality of display modules creates a local area network (LAN) where all modules are addressable by the master control unit and relevant data can be transferred among the LAN members.

The above invention aspects will be made clear in the drawings and detailed description of the invention.

DETAILED DESCRIPTION OF THE INVENTION

In this detailed description, numerous specific details are set forth in order to provide a thorough understanding of the invention. However, it will be understood by those skilled in the art that these are specific embodiments, and that the present invention may be practiced also in different ways that embody the characterizing features of the invention as described and claimed herein.

Figure 1:
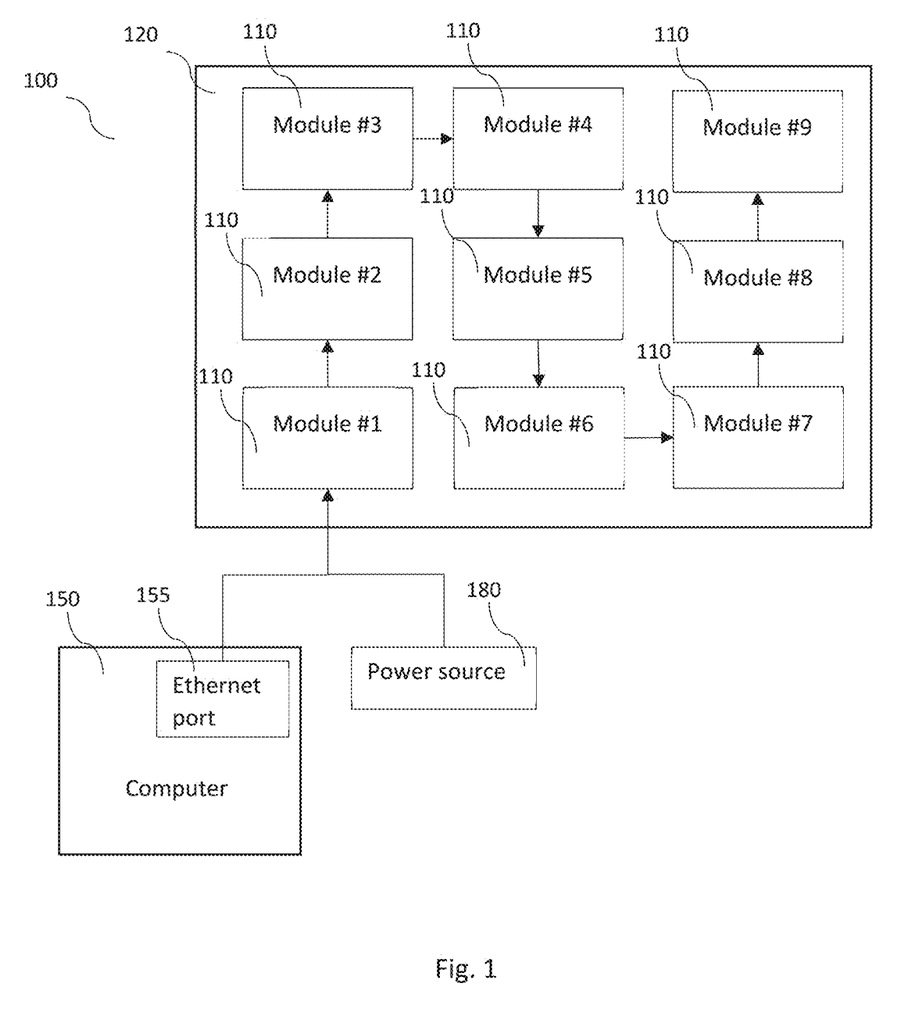
FIG. 1 is a schematic diagram illustrating the components and their arrangement of an embodiment of the present invention.

FIG. 1 is a schematic diagram illustrating the overall architecture of certain embodiments of the modular display system. The modular display system 100 includes a master control unit in the form of a computing device represented herein as controller or computer 150 with an Ethernet port 155, a power source 180, and a plurality of display modules 110. In some embodiments, the display modules 110 are mounted in a frame to create a visually seamless display screen 120. Text, graphic, or video data, as well as control data, are transmitted from the computer 150 via Ethernet cable connections to each display module 110. The display modules are also powered by the power source 180. In some embodiments, a "daisy chain" configuration is used for the power and data, where the display modules 110 are connected in series to one another, rather than each module 110 being connected separately, in parallel, to the computer 150 and the power source 180.

In certain embodiments alternative to those depicted in FIG. 1, daisy-chain connections are used for data connection while each display module is powered in parallel or in groups from an external power source. This way, the power connections are independent from the data connections.

Figure 2:
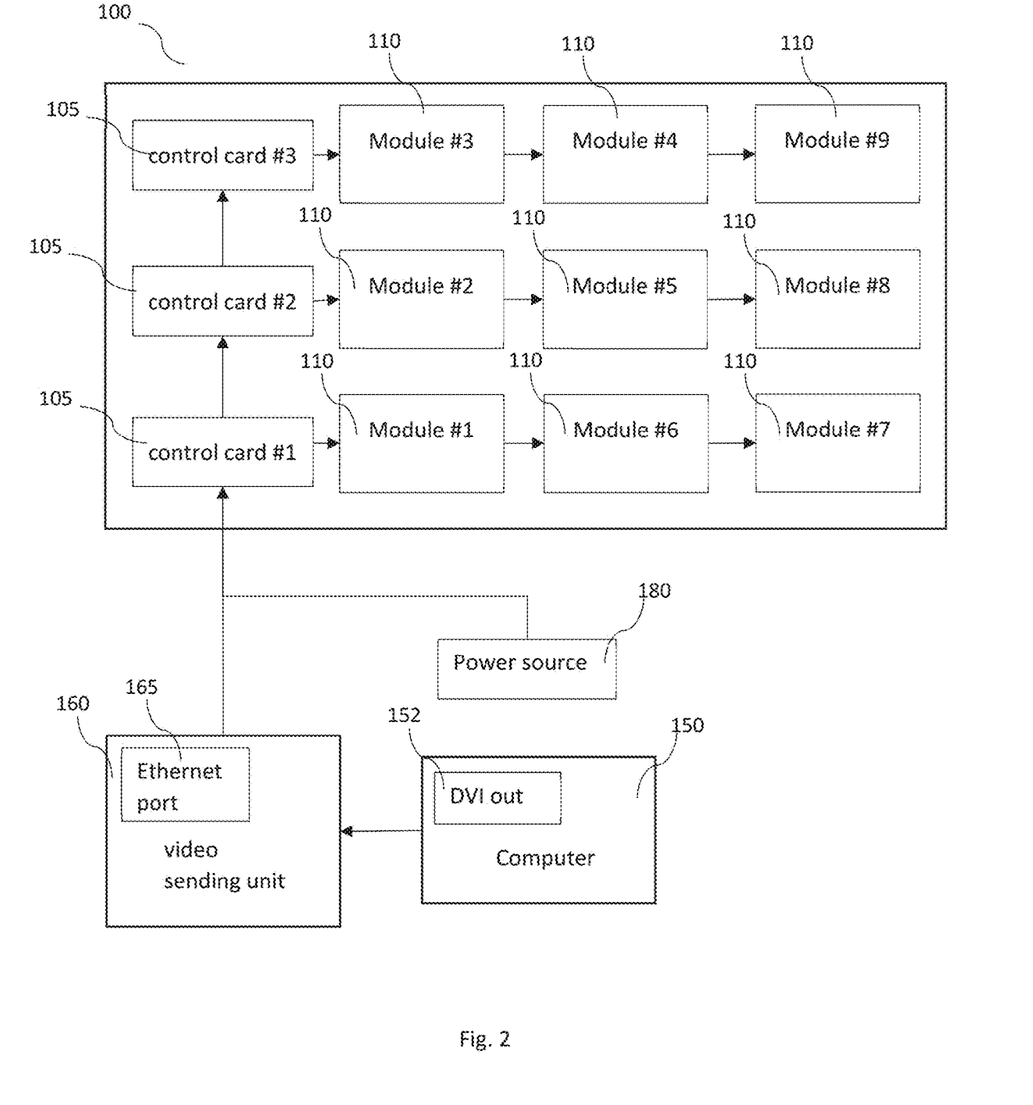
FIG. 2 is a schematic diagram illustrating the components and their arrangement of another embodiment of the present invention.

FIG. 2 shows the overall architecture of certain other embodiments of the modular display system. As shown here, in some embodiments, the modular display system 100 includes a separate video sending unit 160 connected to the computer 150 via a Digital Video Interactive (DVI) output 152. The modular display system 100 also includes one or more circuit elements represented as control cards 105, each of which functions as an interface for transmission of content between the video sending unit 160 with the individual display modules 110.

Figure 3:
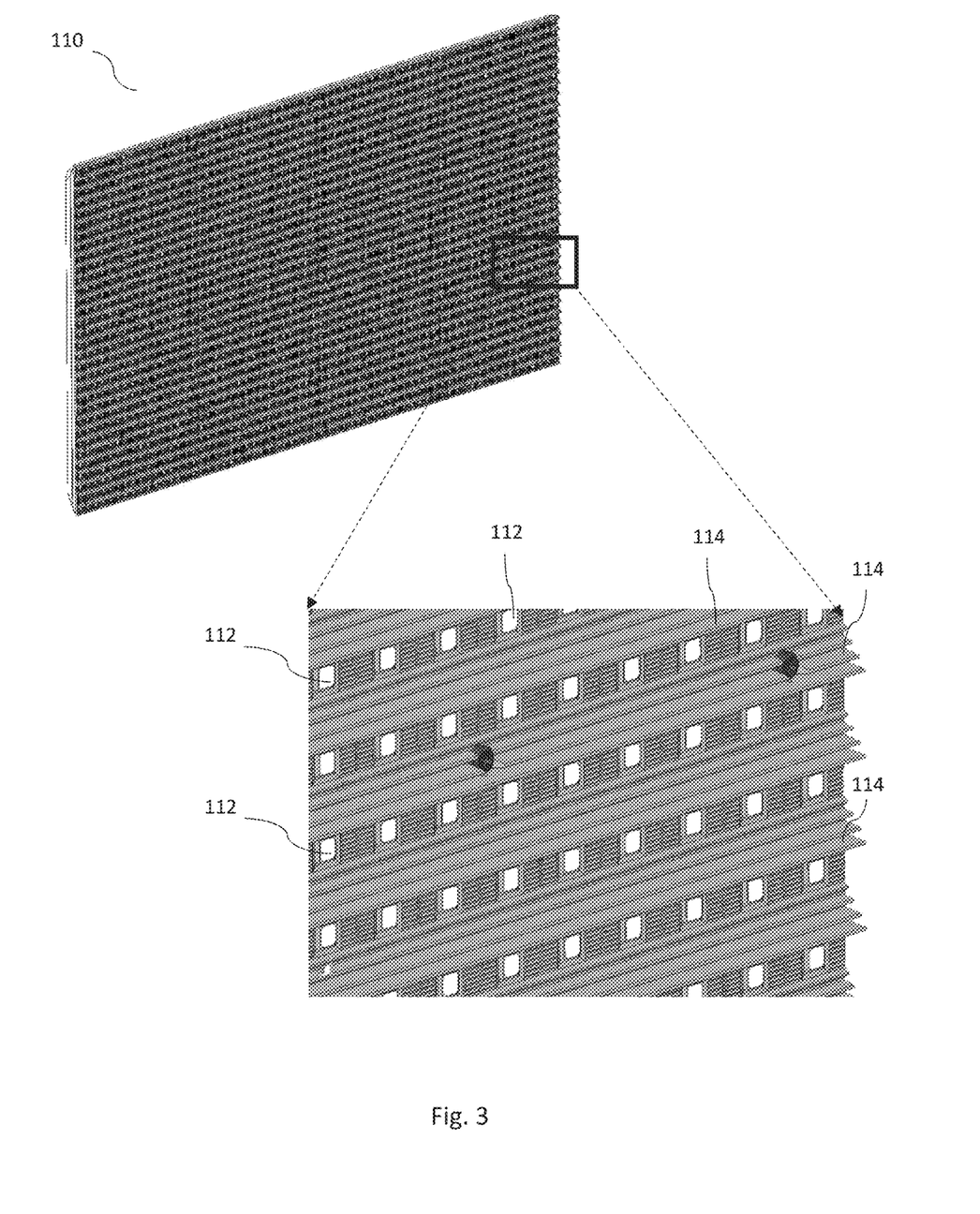
FIG. 3 is a front perspective and detailed view of an individual module in an embodiment of the present invention.

FIG. 3 shows the front face of an embodiment of a display module 110 in the present invention. As can be seen here, the display module 110 includes an array of light-emitting diode (LED) assemblies 112. Each LED assembly 112 serves as an individual pixel or display element of the larger digital display system. In some embodiments, each LED assembly 112 includes red, green, and blue (RGB) LEDs that can be selectively activated and at defined brightnesses or for defined times to reproduce a range of colors. In alternative embodiments, single-color LEDs are used for monochromatic images instead of RGB LEDs for full color. In certain embodiments, each of the plurality of display modules 110 also includes rows of visors 114 on the front to shield the LED assemblies 112 from glare and to improve contrast.

Figure 4:
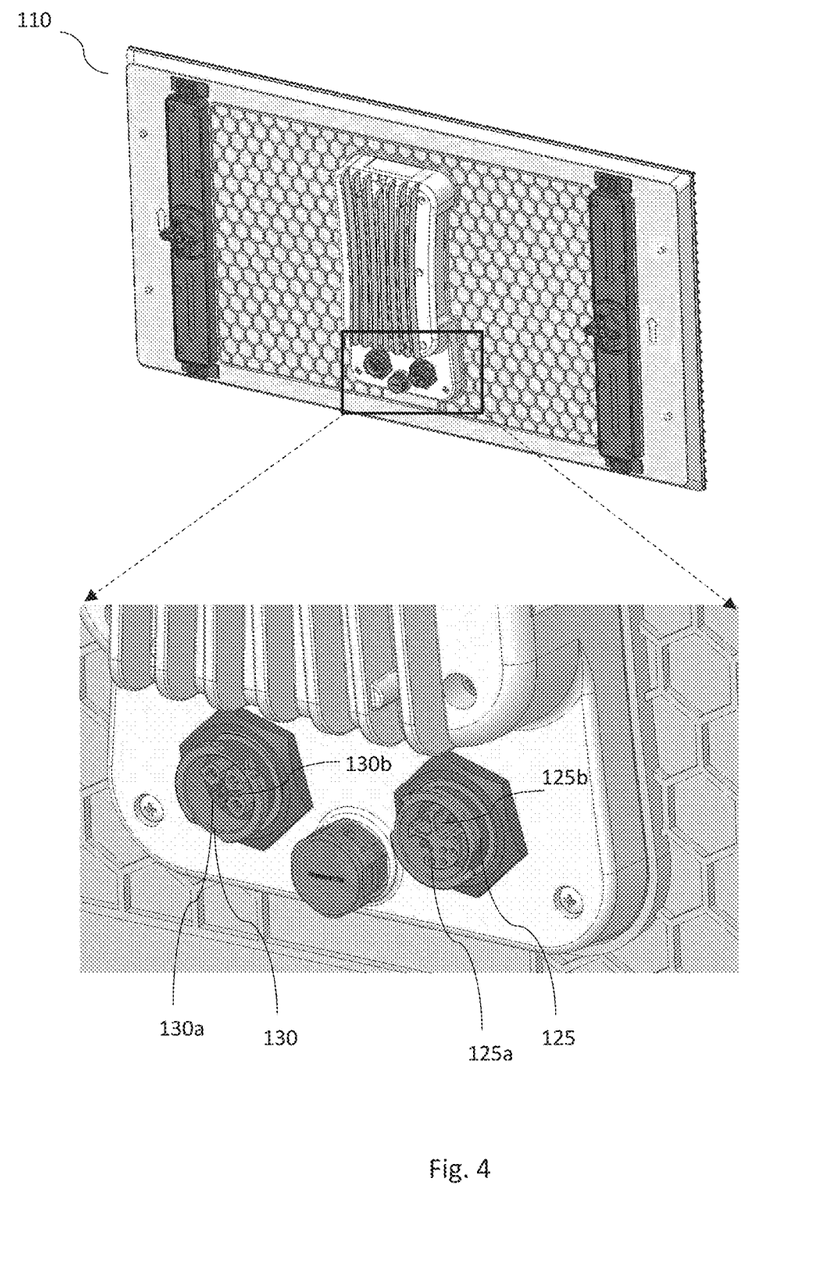
FIG. 4 is a rear perspective and detailed view of an individual module in an embodiment of the present invention.

FIG. 4 shows a back side of certain embodiments of a display module 110 in the present invention. In some embodiments, each display module 110 has an input port 125 and an output port 130 in the back. These ports allow each of the modules 110 to be connected in series (i.e., daisy chained) to others of the modules 110. Each input port 125 includes an Ethernet-IN connector 125a and a power-IN connector 125b. Similarly, each output port 130 includes an Ethernet-OUT connector 130a and a power-OUT connector 130b. The design of the ports 125, 130 allows combining a data line and a power line into one data/power cable. In alternative embodiments, the Ethernet and power connections are not combined, and data and power connections use separate input and output ports.

Figure 5:
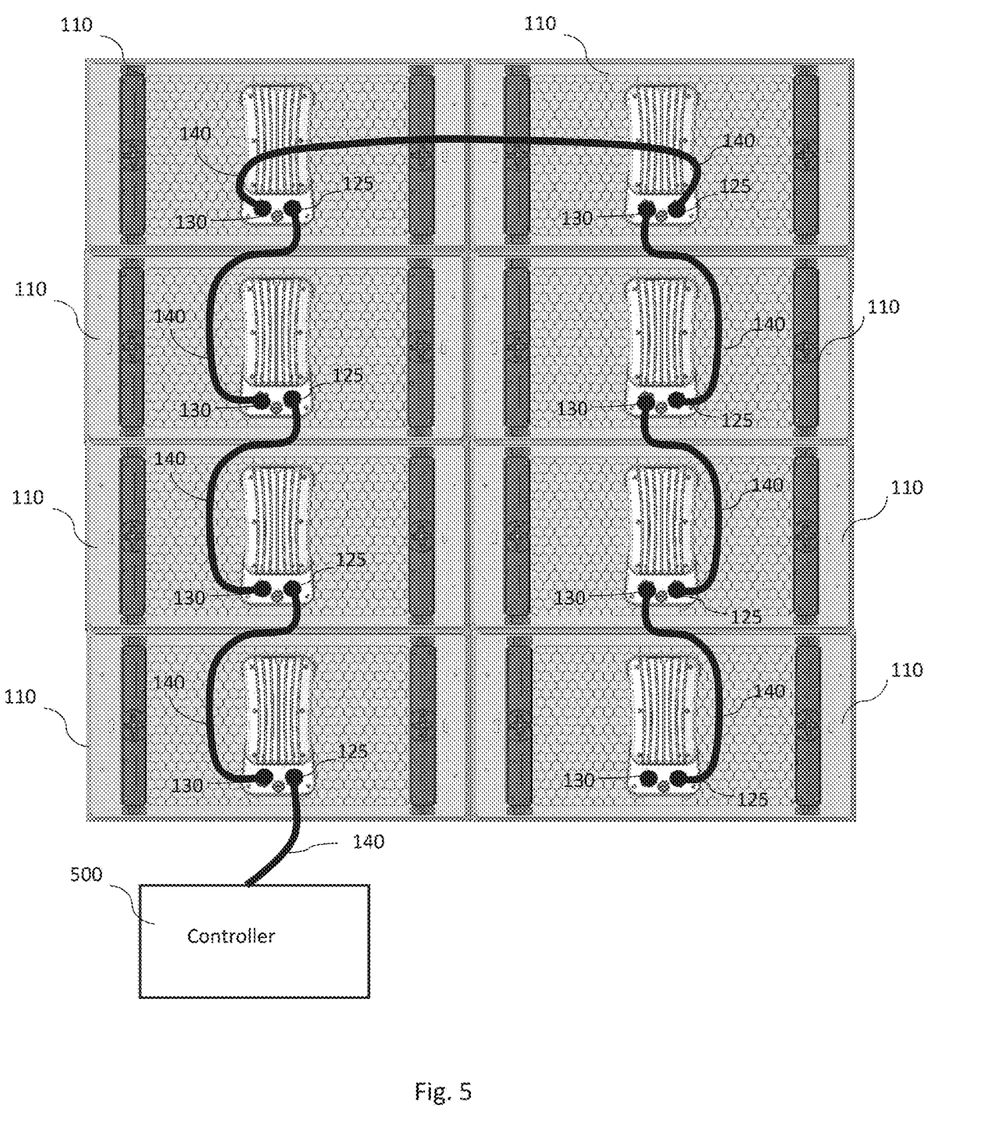
FIG. 5 is a rear view of an embodiment of the present invention.

FIG. 5 shows the cable connection of multiple display modules 110 in some embodiments of the display system. A data/power cable 140 connects the input port 125 of the first display module 110 to a control unit 500 serving as power and data sources. Another section of data/power cable 140 connects the output port 130 of the first display module 110 to the input port 125 of a second first display module 110.

The rest of the display modules 110 are connected in series in a similar manner. Due to this "daisy chain" configuration of connections, the data/power cables 140 are rated to handle far more power and data rate than is required for a single display module 110.

In some embodiments, the power source 180 supplies AC power, and each display module 110 has its own DC power supply to convert the AC power down to working voltage for the electronics. In certain other embodiments, one or more of the display modules 110 are powered by a single DC power supply rather than each module having its own. In some alternative embodiments, locking edge connectors that mate the modules 110 electrically through their edges can be used, eliminating the need for cables, such as described in the patent and published patent application incorporated herein by reference.

Figure 6:
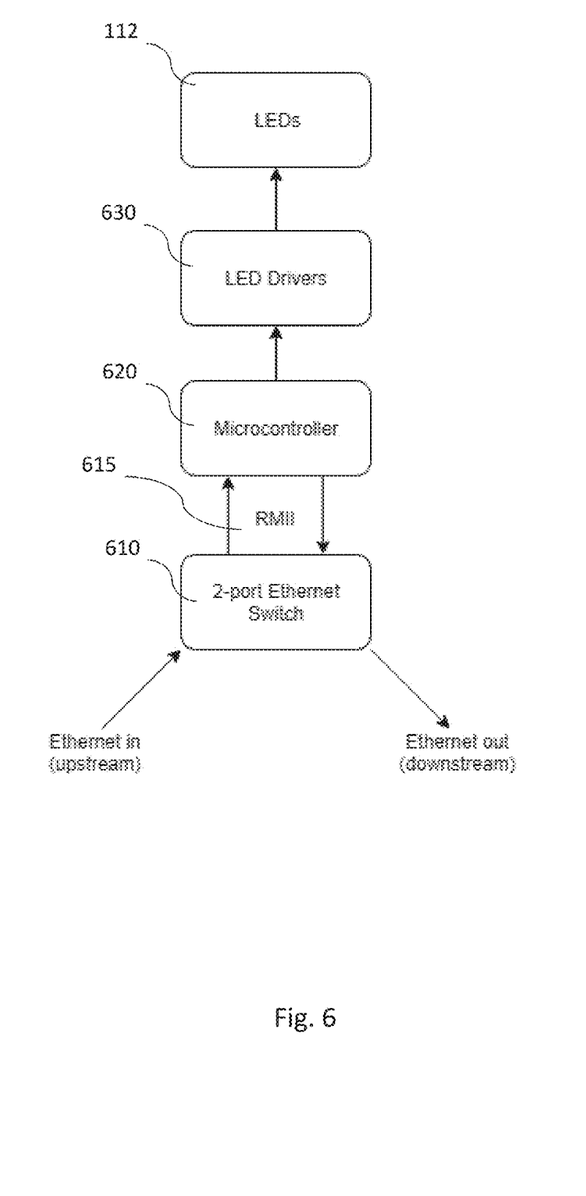
FIG. 6 is a schematic diagram illustrating the control components and their arrangement of an individual module in an embodiment of the present invention.

FIG. 6 is a schematic diagram illustrating the hardware data control components of display module 110 in certain embodiments of the present invention. Each display module 110 includes a 2-port Ethernet switch 610, a microcontroller 620, and LED drivers 630. The 2-port Ethernet switch 610 is responsible for receiving Ethernet packets intended for the respective module's MAC address and forwarding packets to other display modules. In certain embodiments, Ethernet packets received by the switch are transferred to the microcontroller 620 through an RMII (Reduced Media Independent Interface) 615 with the switch. An alternative to RMII is MII (Media Independent Interface). The choice of interfaces depends on the hardware used and desired feature set.

The microcontroller 620 parses received Ethernet packets for video and control data, uses this data to prepare a display buffer, and updates the LED drivers 630 and ultimately displays the image buffer with the LEDs. In some embodiments, the microcontroller 620 can be implemented as a microprocessor with an Ethernet adapter. In certain embodiments, the microcontroller 620 has media access control (MAC) capability to interface directly with the Ethernet switch via RMII. An alternative embodiment could use a non-MAC microcontroller that interfaces with a discrete MAC device as an intermediary between the microcontroller and a switch or a PHY (physical layer). In certain embodiments, the microcontroller 620 can be replaced by other types of integrated circuits, such as an FPGA (field-programmable gate array), an SoC (system on a chip), or an ASIC (application-specific integrated circuit).

Figure 7:
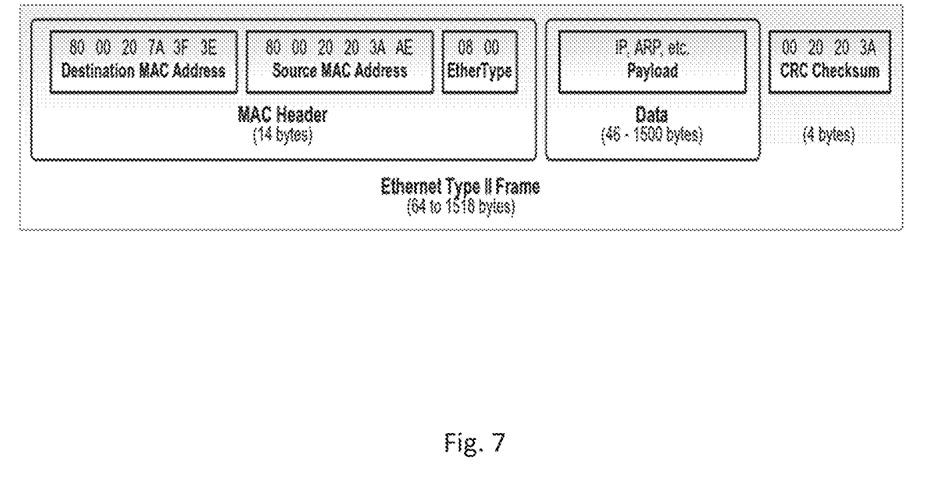
FIG. 7 is an illustration of a data packet used in an embodiment of the present invention.

FIG. 7 is an illustration of a data packet used in certain embodiments of the present invention. In some embodiments, the Ethernet Type II format is used, including a 14-byte MAC header, a 46-1500 byte Data payload, and a 4-bytes CRC data checksum. The Data payload contains the image/video data to be displayed as well as control data.

In some embodiments, the amount of data required to update a single one of the display modules 110 is 6.14 kB. Since the maximum payload size of an Ethernet II packet is 1.5 kB, the image data need to be distributed among several Ethernet packets to deliver all of it to the display. Therefore, the controller software needs to prepare and send video data in a row-by-row sequence, including the starting X-Y coordinates of the image data at the start of the payload.

In certain embodiments, each display module 110 is assigned a MAC address. In some embodiment, the MAC addresses are by the controller software at the time of initial setup of a display. These MAC addresses don't change dynamically and only get re-assigned if the mapping of the display changes (i.e., when any of the modules 110 are re-arranged or replaced). In certain alternative embodiments, the display modules 110 are programmed with unique MAC addresses from the factory. Their MAC addresses are discovered by the controller software when a display module 110 is set up.

In certain embodiments, the video packets are broadcast to reach every display module 110 in the system (destination MAC address=all). When the modules 110 receive these video packets, they check the starting X-Y coordinates of the data, determine if the packet contains image data intended for the module 110 based on the starting coordinates compared to its own X-Y offset, and parse the data if so. The controller 150 also sends other control commands to the modules 110 inside these payloads, including commands to assign MAC addresses, mapping offsets, update firmware, update the image, etc. The modules 110 also send responses back to the controller 150 containing diagnostic data within the payload.

Figure 8:
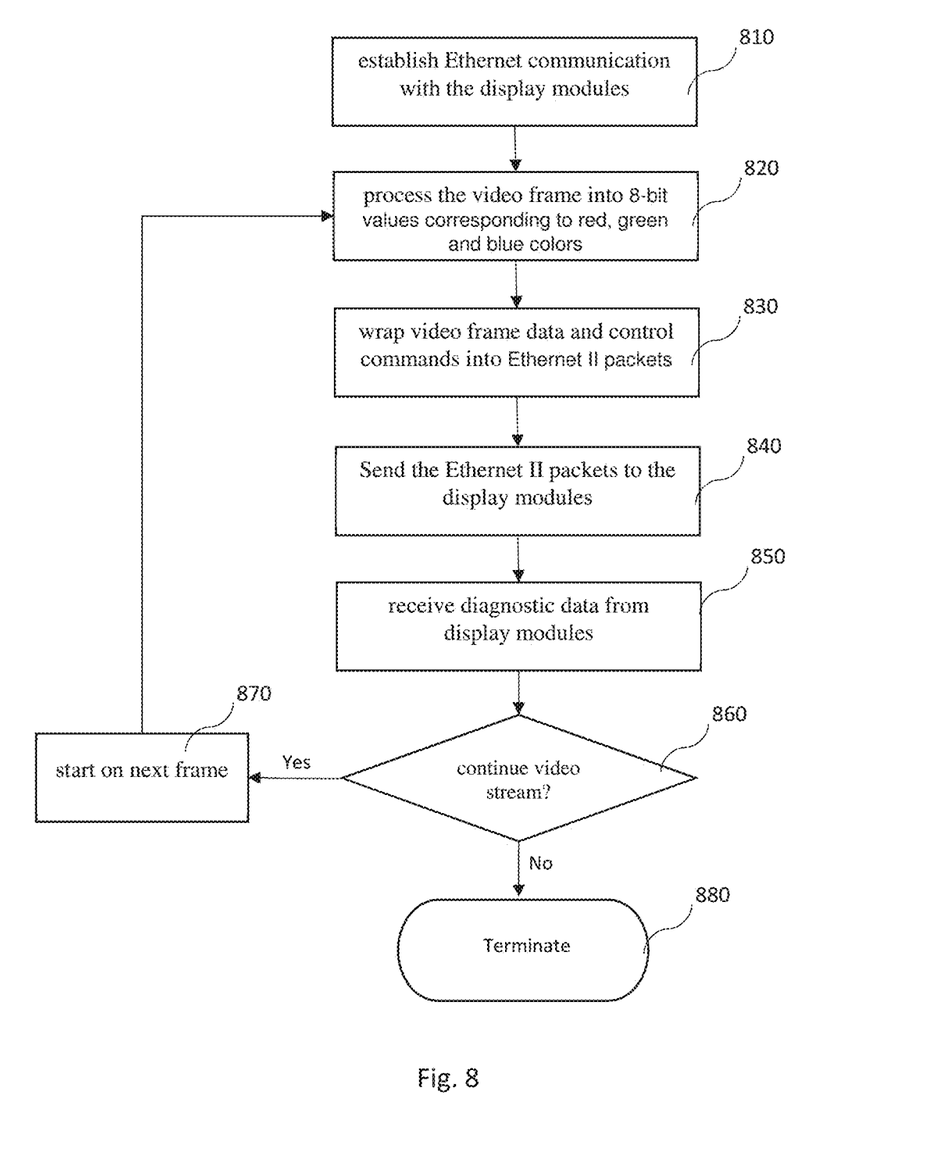
FIG. 8 is a flow chart showing the process of preparing and sending data in the control unit of an embodiment of the present invention.

FIG. 8 is a flow chart showing the process of preparing and sending data in the control unit in some embodiments of the present invention. First, an Ethernet communication is established between the control unit with the display modules (Step 810). The control unit then processes the video frame into 8-bit values corresponding to red, green and blue colors (Step 820) and wraps the video frame data and control commands into Ethernet II packets (Step 830). The Ethernet II packets are next sent to the display modules (Step 840) and the control unit receives diagnostic data from display modules (Step 850). Based on the video stream as well as the received diagnostic data, the control unit decides if the video stream is to be continued (Step 860). If yes, the next frame is to be processed (870) and the program goes back to Step 820. If no, the video stream ends and the program terminates (Step 880).

Figure 9:
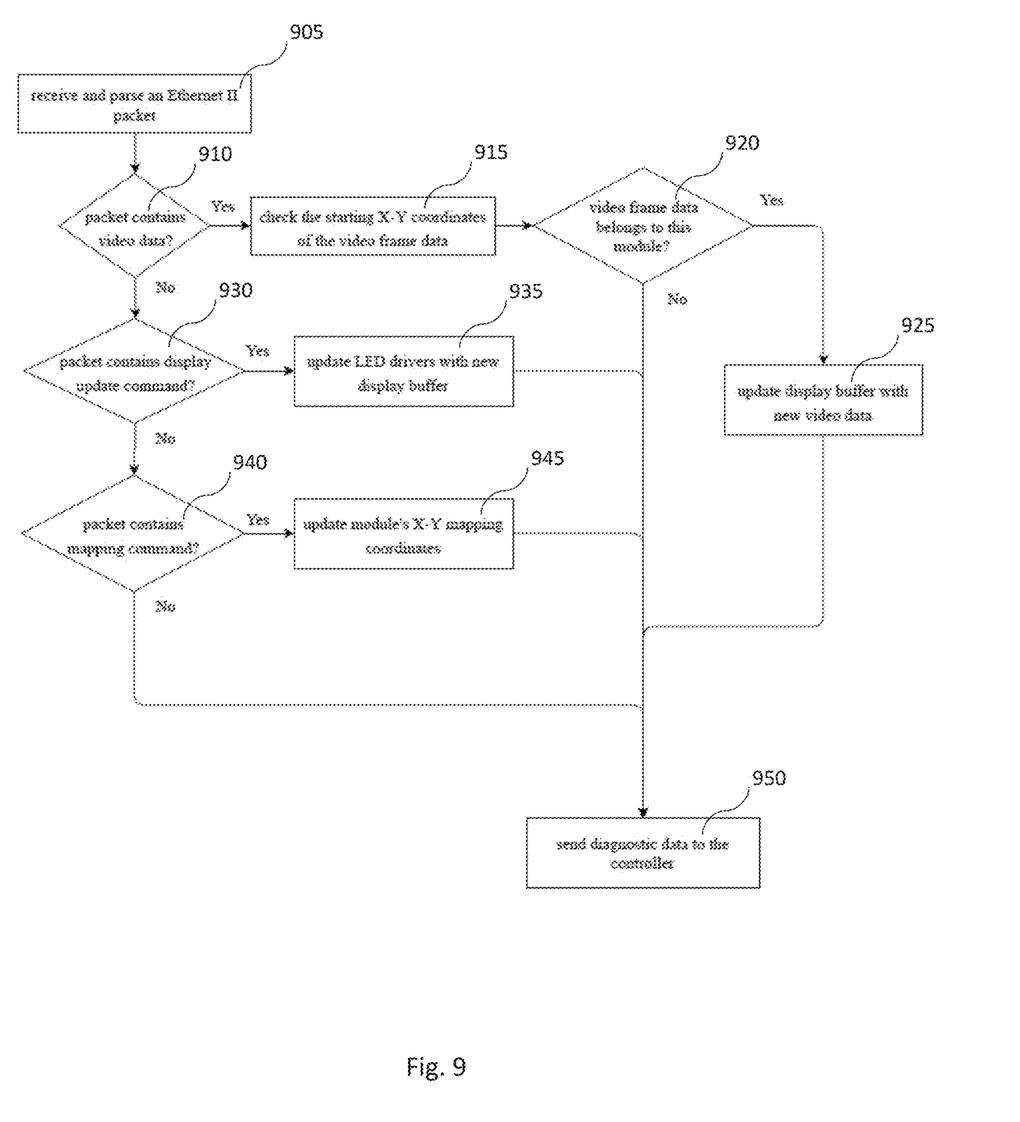
FIG. 9 is a flow chart showing the process of receiving and processing data by an individual module of an embodiment of the present invention.

FIG. 9 is a flow chart showing the process of receiving and processing data by an individual display module 110 in certain embodiments of the present invention. When the display module 110 receives and parses an Ethernet II packet (Step 905), its microcontroller software determines if the packet contains video data (Step 910). If yes, the software checks the starting X-Y coordinates of the video frame data (Step 915) and determines whether the video frame data belongs to this display module (Step 920). If yes, the microcontroller software updates the display buffer with the new video data (925) and sends data to the control unit (Step 950). If the video frame data does not belong to this module, Step 925 is skipped and diagnostic data is sent to the controller (Step 950).

In Step 910, if it is determined that the packet does not contain video data, the software checks if the packet contains display update command (Step 930). If yes, the LED drivers are updated with new display buffer (Step 935), and diagnostic data is sent to the control unit (Step 950). In Step 930, if it is determined that the packet does not contain display update command, the software checks if the packet contains mapping command (Step 940). If yes, X-Y mapping coordinates are updated for the module (Step 945), and diagnostic data is sent to the control unit (Step 950). In Step 940, if the packet does not contain mapping command, diagnostic data is sent to the control unit (Step 950).

The controller 150 or the microcontroller 620 is configured and arranged to perform the described functions and steps embodied in computer instructions stored and accessed in any one or more of the manners described. The functions and steps, such as the functions and steps of the present invention described herein, individually or in combination, may be implemented as a computer program product tangibly as computer-readable signals on a computer-readable medium, such as any one or more of the computer-readable media described. Such computer program product may include computer-readable signals tangibly embodied on the computer-readable medium, where such signals define instructions, for example, as part of one or more programs that, as a result of being executed by the computer processor, instruct the computer processor to perform one or more processes or acts described herein, and/or various examples, variations and combinations thereof. Such instructions may be written in any of a plurality of programming languages, for example, XML, Java, Visual Basic, C, or C++, and the like, or any of a variety of combinations thereof. The computer-readable medium on which such instructions are stored may reside on one or more of the components described above and may be distributed across one or more such components.

The foregoing description and accompanying drawings illustrate the principles, preferred or example embodiments, and modes of assembly and operation, of the invention; however, the invention is not, and shall not be construed as being exclusive or limited to the specific or particular embodiments set forth hereinabove.

What is claimed is:

1. A control system for the control of a modular display to enable the direct exchange of control and display data to the modular display, the system comprising:
 a plurality of display modules arranged and connected together to create a larger unified display;
 a controller having one or more data exchange ports and a computer processor configured to execute controller software stored on non-transitory computer-readable media, the controller software programming the computer processor to:
  prepare display data as several data payloads by processing a video frame as image data in a row-by-row sequence into the several data payloads and including a starting X-Y coordinate pair of the image data in each data payload at the start of that data payload; and
 one or more connections between the controller and the plurality of display modules,
 wherein the controller is coupled to the plurality of display modules through the one or more data exchange ports,
 wherein the controller is configured to broadcast control and display data to the plurality of display modules associated with visual displays generated on the plurality of display modules and to receive diagnostic data from each of the plurality of display modules, and
 wherein each of the plurality of display modules has one or more data exchange ports for receiving the control and display data from the controller and for transmitting diagnostic data to the controller.

2. The display system of claim 1, wherein the one or more data exchange ports of the controller is a plurality of data exchange ports a number of which is the same as or greater than a number of the plurality of display modules, and wherein each of the plurality of display modules is coupled directly to the controller through the one or more connections.

3. The display system of claim 1, wherein the one or more data exchange ports of the controller is at least one Ethernet data exchange port, wherein the at least one data exchange port of the controller is coupled through one of the one or more connections to an Ethernet input port of a first one of the plurality of display modules, wherein the first one of the plurality of display modules includes an Ethernet output port, wherein the Ethernet output port of the first of the plurality of display modules is coupled through one of the one or more connections to an Ethernet input of a second one of the plurality of display modules, and wherein remaining ones of the plurality of display modules are coupled together in a daisy-chain configuration through the one or more connections until all of the plurality of display modules are coupled to the controller in a serial configuration.

4. The system of claim 1, wherein connections between the controller and the plurality of display modules are used to form a local area network among the plurality of display modules and the controller to enable addressing and transmission of data from the controller to the plurality of display modules through the local area network.

5. The system of claim 1, wherein each of the one or more connections is an Ethernet connection.

6. The system of claim 1, wherein each of the plurality of display modules includes a 2-port Ethernet switch, a microcontroller and a plurality of LED drivers.

7. The system of claim 6, wherein each of the plurality of display modules includes either a media independent interface or a reduced media independent interface configured to transfer Ethernet packets received at the 2-port Ethernet switch to the microcontroller.

8. The system of claim 1, wherein the controller software further programs the computer processor to process the video frame into 8-bit values corresponding to red, green, and blue colors.

9. The system of claim 1, wherein the controller software further programs the computer processor to wrap the several data payloads and control commands into Ethernet II packets.

10. The system of claim 9, wherein each display module includes an array of LED assemblies and a microcontroller configured to execute microcontroller software stored on non-transitory computer-readable media, the microcontroller software programming the microcontroller to:
parse received Ethernet II packets for video and control data;
prepare a display buffer; and
update LED drivers to display the display buffer through the LED assemblies.

11. The system of claim 10, wherein the microcontroller software further programs the microcontroller to:
parse each received Ethernet II packet and determine if the received packet includes video image data or control data;
for each packet determined to contain video image data:
check the starting X-Y coordinate pair;
determine, based on the staring X-Y coordinate pair, whether video frame data from that packet belongs to that display module; and
when the video frame data is determined to belong to that display module, update the display buffer with the video frame data; and
send diagnostic data to the controller.

12. The system of claim 11, wherein the microcontroller software further programs the microcontroller to:
for each packet determined to contain control data:
when the control data includes a display update command, update the LED drivers with the display buffer; and
when the control data includes a mapping command, update an X-Y mapping coordinate pair for that display module.

13. The system of claim 9, wherein each display module consists of:
a combined power and ethernet input connector;
a combined power and ethernet output connector;
a system on a chip combining a central processing unit comprising a microcontroller or other integrated circuit, memory, and an input/output interface;
a two port ethernet switch connecting the ethernet input connector and the ethernet output connector to the central processing unit through the input/output interface;
an array of LED assemblies mounted on a printed circuit board and connected to the system on a chip;
one or more louvers on front of the display module shielding the LED assemblies from glare;
a locking device for connecting the display module to a frame of modular display; and
software, stored within the memory, comprising LED drivers and programming executable by the central processing unit for:
receiving and sending ethernet packets through the input and output connectors;
preparing a display buffer;
parsing each received packet and determining if the received packet includes video image data or control data;
for each packet determined to contain video image data:
checking the starting X-Y coordinate pair;
determining, based on the staring X-Y coordinate pair, whether video frame data from that packet belongs to that display module; and
when the video frame data is determined to belong to that display module, updating the display buffer with the video frame data;
for each packet determined to contain control data:
when the control data includes a display update command, updating the LED drivers with the display buffer to display the display buffer through the LED assemblies; and
when the control data includes a mapping command, updating an X-Y mapping coordinate pair for that display module; and
sending diagnostic data to the controller.

* * * * *